United States Patent
Xia et al.

(10) Patent No.: US 10,908,625 B2
(45) Date of Patent: Feb. 2, 2021

(54) INTELLIGENT DYNAMIC CONTROL SYSTEM OF INDOOR TEMPERATURE AND CONTROL METHOD THEREOF

(71) Applicants: MCC REAL ESTATE GROUP CO., LTD., Beijing (CN); TSINGHUA UNIVERSITY, Beijing (CN)

(72) Inventors: Hongxing Xia, Beijing (CN); Dalu Yuan, Beijing (CN); Qiang Hao, Beijing (CN); Bin Cao, Beijing (CN); Hecheng Yang, Beijing (CN)

(73) Assignees: MCC REAL ESTATE GROUP CO., LTD, Beijing (CN); TSINGHUA UNIVERSITY, Beijing (CN)

( * ) Notice: Subject to any disclaimer, the term of this patent is extended or adjusted under 35 U.S.C. 154(b) by 50 days.

(21) Appl. No.: 16/288,555

(22) Filed: Feb. 28, 2019

(65) Prior Publication Data

US 2019/0354124 A1    Nov. 21, 2019

(30) Foreign Application Priority Data

Feb. 28, 2018    (CN) .......................... 2018 1 0165926

(51) Int. Cl.
*G05D 23/19*    (2006.01)
*F24F 11/46*    (2018.01)

(52) U.S. Cl.
CPC .......... *G05D 23/1917* (2013.01); *F24F 11/46* (2018.01); *G05D 23/1927* (2013.01)

(58) Field of Classification Search
CPC . G05D 23/1917; G05D 23/1927; F24F 11/46; F24F 2130/10; F24F 11/65;
(Continued)

(56) References Cited

U.S. PATENT DOCUMENTS 9,016,593 B2 *   4/2015   Metselaar .......... G05D 23/1902
                                                            236/1 C
9,696,052 B2 *   7/2017   Malchiondo ............. F24F 11/30
(Continued)

*Primary Examiner* — Charles R Kasenge
(74) *Attorney, Agent, or Firm* — Platinum Intellectual Property LLP

(57) ABSTRACT

The present invention provides an intelligent dynamic control system of an indoor temperature. The system includes a controller, and a human-computer interaction interface, a temperature adjustment device, an indoor temperature collector and an outdoor temperature collector, which are respectively connected with the controller. According to the technical solution provided by the present invention, the system is simple, convenient to implement, good in control effect and remarkable in energy saving effect; outdoor temperature data are collected by the outdoor temperature collector and are compared with the indoor temperature collected by the indoor temperature collector, in combination with the parameters of resident population, and by means of analysis and intelligent adjustment of the indoor temperature, the most comfortable temperature is provided for indoor residents; furthermore, constant control and constant adjustment can be achieved, thereby not only ensuring the comfort, but also avoiding unnecessary energy consumption; and respective adjustment is provided for each house and each room, the space occupation is small, and the adjustment efficiency is high.

10 Claims, 1 Drawing Sheet

(58) Field of Classification Search
CPC ........ F24F 11/64; F24F 11/50; F24F 2110/10;
F24F 2110/12; F24F 11/70
See application file for complete search history.

(56) References Cited

U.S. PATENT DOCUMENTS

| | | | |
|---|---|---|---|
| 9,968,877 B2* | 5/2018 | Chan | F24F 11/62 |
| 9,982,906 B2* | 5/2018 | Vega | F24F 11/52 |
| 10,295,214 B2* | 5/2019 | Bentz | F24F 11/63 |
| 10,677,486 B1* | 6/2020 | Vega | G06Q 50/06 |
| 2012/0305661 A1* | 12/2012 | Malchiondo | F24F 11/74 |
| | | | 236/44 A |
| 2013/0018513 A1* | 1/2013 | Metselaar | F24F 11/30 |
| | | | 700/278 |
| 2015/0308702 A1* | 10/2015 | Yabuta | G05B 15/02 |
| | | | 700/276 |
| 2015/0316281 A1* | 11/2015 | Yabuta | G05B 15/02 |
| | | | 700/276 |
| 2015/0346741 A1* | 12/2015 | Murthy | G05D 23/1917 |
| | | | 700/276 |
| 2016/0116178 A1* | 4/2016 | Vega | F24F 11/30 |
| | | | 700/276 |
| 2016/0123617 A1* | 5/2016 | Vega | G06N 20/00 |
| | | | 706/12 |
| 2018/0031261 A1* | 2/2018 | Bentz | F24F 11/62 |

\* cited by examiner

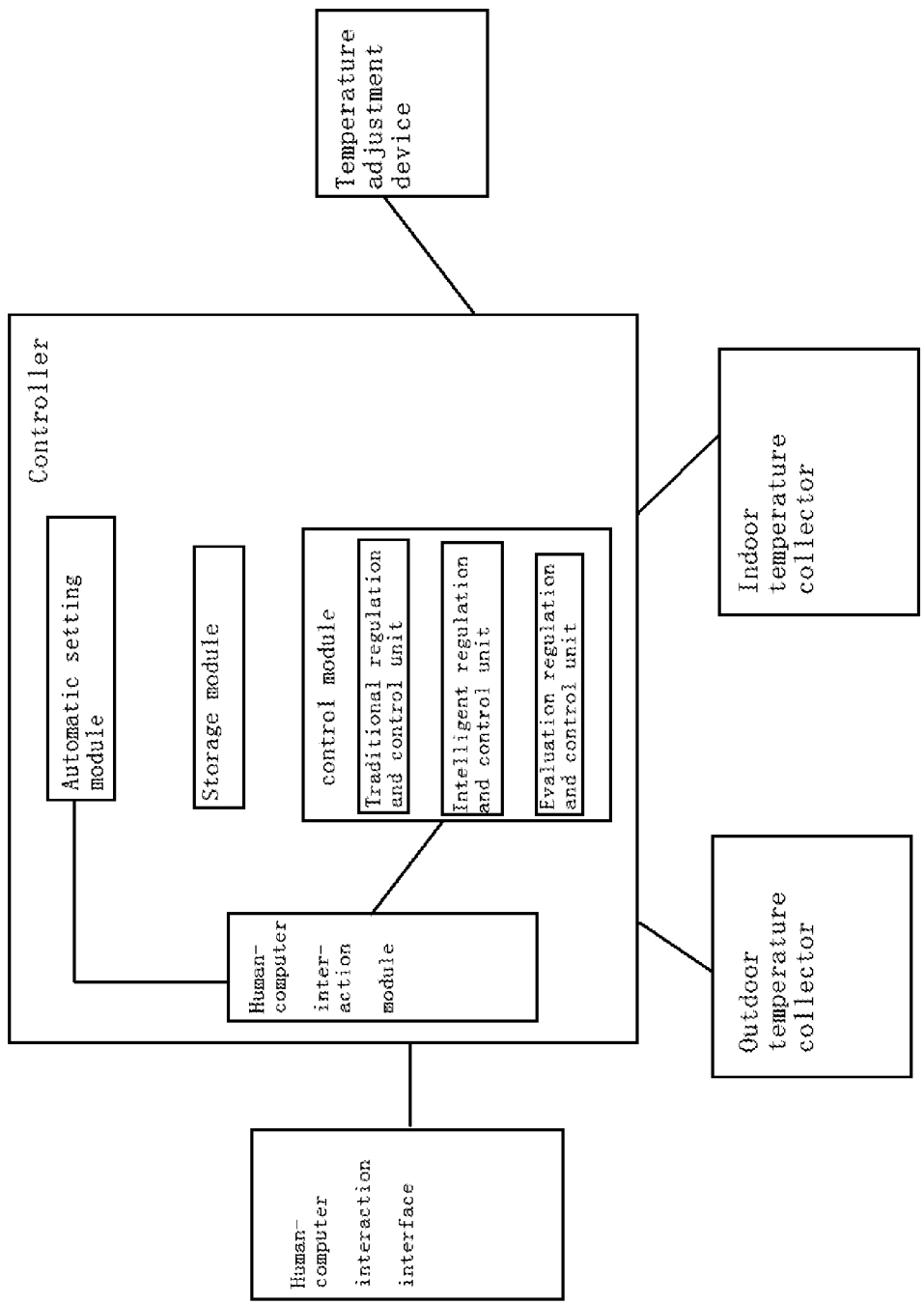

INTELLIGENT DYNAMIC CONTROL SYSTEM OF INDOOR TEMPERATURE AND CONTROL METHOD THEREOF

FIELD OF THE PRESENT INVENTION

The present invention relates to an indoor temperature control system, and in particular to an intelligent dynamic control system of an indoor temperature.

BACKGROUND OF THE PRESENT INVENTION

With the rapid development of urbanization, a building has been upgraded from a basic function of ensuring living to providing high quality of life, and the function of the building is an important factor reflecting the living quality. The control of indoor temperature has become more and more intelligent and personalized.

Current indoor temperature control generally has two forms. One is a "multiple on-line+new draught fan" household independent air conditioning and fresh air system; the other is a "radiation end+concentrated fresh air" type centralized air conditioning fresh air system with the concepts of "constant temperature, constant humidity and constant oxygen". The two systems generally have the problems of high energy consumption, low efficiency, poor comfort, operation management difficulty and the like, cannot perform real-time dynamic adjustment with the change of outdoor temperature and the state requirements of different persons indoors, and cannot satisfy the personalized demands of users for indoor temperature. The centralized air conditioning system with the radiation end is poor in adjustability and slow in system feedback, and has difference from the thermal perception of the human body, so that the comfort is low; and the long-term living in the "constant temperature, constant humidity, constant oxygen" temperatures will lead to poor heat resistance of the human body accompanying with various kinds of discomforts of the nervous system, the digestive system, the respiratory system, the skin mucous membrane and the like; and with respect to the traditional "multiple on-line+new draught fan" household independent system, the temperature regulation, the humidity regulation and the ventilation adjustment are difficult to adapt and are very difficult to set to optimal state points, and thus the comfortable sensation is difficult to achieve.

Therefore, it is necessary to provide an intelligent dynamic control system of an indoor temperature, so that it can adjust indoor temperature parameters with the change of an outdoor temperature changes so as to reduce the energy consumption and improve the efficiency.

SUMMARY OF THE PRESENT INVENTION

In view of the shortcomings of the prior art, the applicant designs an intelligent dynamic control system of an indoor temperature; and the system can adjust indoor temperature parameters with the change of an outdoor temperature, and has the advantages of energy saving, low consumption and high efficiency.

The purpose of the present invention is achieved by the following technical solution:

The present invention provides an intelligent dynamic control system of an indoor temperature, and the system includes a controller, and a human-computer interaction interface, a temperature adjustment device, an indoor temperature collector and an outdoor temperature collector, which are respectively connected with the controller.

Preferably, the controller includes a human-computer interaction module, a regulation and control module, an automatic setting module, a temperature output module and a storage module;

the human-computer interaction module is respectively connected with the regulation and control module and the automatic setting module;

the temperature output module is respectively connected with the regulation and control module and the automatic setting module; and the storage module is respectively connected with the regulation and control module and the automatic setting module.

Preferably, the regulation and control module includes a traditional regulation and control unit, an evaluation regulation and control unit and an intelligent regulation and control unit.

Preferably, the storage module includes an evaluation regulation and control storage unit, an indoor slip average temperature storage unit, an outdoor slip average temperature storage unit, and a historical setting data storage unit.

Preferably, the human-computer interaction module is connected with the human-computer interaction interface.

Preferably, the temperature output module is connected with the temperature adjustment device.

The control system provided by the present invention performs control according to the following steps:

(1) sending an operation instruction to the controller through the human-computer interaction interface;

(2) determining, by the controller, a temperature control value according to the operation instruction; and (3) sending, by the controller, the temperature control value to the temperature adjustment device.

Preferably, the operation instructions in the step (1) includes:

an automatic setting instruction, a traditional regulation and control instruction, an intelligent regulation and control instruction and an evaluation regulation and control instruction.

Preferably, the step (2) includes:

when the operation instruction is the traditional regulation and control instruction, using, by the traditional regulation and control unit, a temperature value input by the human-computer interaction interface as the temperature control value, and respectively sending the temperature control value to the temperature output module and the historical setting data storage unit of the storage module;

when the operation instruction is the intelligent regulation and control instruction, determining, by the intelligent regulation and control unit, the temperature control value according to parameters input by the human-computer interaction interface, and respectively sending the temperature control value to the temperature output module and the historical setting data storage unit of the storage module;

when the operation instruction is the evaluation regulation and control instruction, determining, by the evaluation regulation and control unit, the temperature control value according to an evaluation value input by the human-computer interaction interface, and respectively sending the temperature control value to the temperature output module and the historical setting data storage unit of the storage module; and when the operation instruction is the automatic setting instruction, determining, by the automatic setting module, the temperature control value according to the automatic setting instruction, and respectively sending the temperature control value to the temperature output module and the historical setting data storage unit of the storage module.

Preferably, when the operation instruction is the intelligent regulation and control instruction, determining, by the intelligent regulation and control unit, the temperature control value according to parameters input by the human-computer interaction interface includes:

calculating, by the intelligent regulation and control unit, an air temperature $t_a$ around the human body according to an average thermal sensation index PMV formula described below:

$$PMV=(0.303e^{-0.036M}+0.0275) \times \{M-W-3.05[5.733-0.007(M-W)-P_a]-0.42(M-W-58.15)-1.73 \times 10^{-2}M(5.867-P_a)-f_{cl}h_c(t_{cl}-t_a)-0.0014M(34-t_a)-3.96 \times 10^{-8}f_{cl}[t_{cl}+273)^4-(t_r+273)^4]\}$$

In the formula, M represents a metabolic rate of the human body; $W/m^2$ represents external mechanical work $W/m^2$ of the human body; $h_c$ represents a convective heat transfer coefficient, $W/m^{2 \cdot \circ}C$; $P_a$ represents a water vapor partial pressure of the air around the human body, $P_a$; $f_{cl}$ represents a clothing area coefficient; $t_r$ represents an indoor average radiant temperature, °C. and $t_{cl}$ represents a clothing outer surface temperature, °C.; and the temperature $t_a$ of the air around the human body is used as the temperature control value $T_{set(n)}$ of the present day.

the parameters input by the intelligent regulation and control unit according to the human-computer interaction interface include: the age of a user and the variety of clothing;

the variety of clothing includes: down jackets, cotton clothes, dust coats, sports and leisure jackets, suit jackets, sweaters, wool vests, autumn clothes, cotton knitwear, long-sleeved shirts, T-shirts, jeans, western style pants, woollen underpants, sweat pants, long johns, trousers, shorts, short skirts, dresses, socks, stockings, leather shoes, sneakers and sandals; and the thermal resistance of a set of clothing is obtained by adding the thermal resistance of each kind of clothing; the thermal resistance of various kinds of clothing includes:

down jackets 0.55, cotton clothes 0.5, dust coats 0.4, sports and leisure jackets 0.3, suit jackets 0.25, sweaters 0.28, wool vests 0.12, autumn clothes/cotton knitwear 0.2, long-sleeved shirts 0.2, short-sleeved shirts/T-shirts 0.09, jeans/western style pants 0.2, woollen underpants 0.28, sweat pants 0.25, long johns/trousers 0.2, shorts 0.06, short skirts 0.4, dresses 0.2, socks 0.02, stockings 0.05, leather shoes/sneakers 0.1 and sandals 0.02.

Preferably, the metabolic rate M of the human body is calculated according to the following formula:

$$M=(M'-0.8)+[72.91-2.03A+0.0437A^2-0.00031A^3]/58.2;$$

In the formula: M' represents the metabolic rate of the human body under different activity types, and A represents the age in the parameters.

Preferably, the value of the PMV includes:

statistics is performed on a maximum value and a minimum value of an outdoor average slip temperature of a located city, and a corresponding relationship between a temperature interval formed by the minimum value to the maximum value and a PMV value interval [−1, 1] is established:

when the outdoor temperature reaches the maximum value, the PMV is 1;

when the outdoor temperature reaches the minimum value, the PMV is −1; and when the outdoor temperature is a temperature between the maximum value and the minimum value, the value of PMV is within the PMV value interval [−1, 1] corresponding to the temperature.

Preferably, determining, by the evaluation regulation and control unit, the temperature control value according to an evaluation value input by the human-computer interaction interface includes:

(1) obtaining (a', T', TSV') stored in the storage module, and obtaining the indoor temperature from the indoor temperature collector; and (2) determining the temperature control value according to the evaluation value, the (a', T', TSV') and the indoor temperature.

Preferably, during the first time regulation and control of the evaluation regulation and control, the step (2) includes:

first, sending a $(a_1, T_1, TSV_1)$ signal to the storage module, and storing, by the storage module, the $(a_1, T_1, TSV_1)$ in the form of (a', T', TSV');

in the formula: $T_1$ represents the indoor temperature during the first time regulation and control; $TSV_1$ represents the evaluation value during the first time regulation and control, the value range thereof is 2 to −2, and the corresponding evaluation value range when the human body feeling heat is 0 to 2; the corresponding evaluation value when the human body feels cold is −2 to 0; and $a_1$ represents the Griffith coefficient, $a_1=0.33$; and second, calculating the temperature control value $T_{set1}$ according to the following formula:

$$T_{set1}=T_1-TSV_1/a_1$$

Preferably, during the non first time regulation and control of the evaluation regulation and control, the step (2) includes:

calculating the parameter B according to the following formula:

$$B = \frac{TSV' - TSV_{(n)}}{T' - T_{(n)}};$$

in the formula: TSV' represents the evaluation value stored in the storage module, T' represents the indoor temperature stored in the storage module, $TSV_{(n)}$ represents the evaluation value during the nth regulation and control, and $T_{(n)}$ represents the indoor temperature during the nth regulation and control; $n \geq 2$;

if $B \in [0.2, 0.5]$, calculating the temperature control value $T_{set(n)}$ according to the following method:

first, correcting the Griffith coefficient, the indoor temperature and the evaluation value according to the following formula:

$$a_n=[0.2(TSV_{(n)}-TSV')/(T_{(n)}-T')+0.8a'];$$

$$T_{(n)}'=(T'+T_{(n)})/2;$$

$$TSV_{(n)}'=[TSV'+TSV_{(n)}]/2;$$

in the formula: $a_n$ represents a corrected Griffith coefficient, $T_{(n)}'$ represents a corrected room temperature during the nth regulation and control, and $TSV_{(n)}'$ represents a corrected evaluation value during the nth regulation and control;

second, sending $(a_n, T_{(n)}', TSV_{(n)}')$ to the storage module, and updating, by the storage module, the (a', T', TSV') by using the $(a_n, T_{(n)}', TSV_{(n)}')$, and storing the same;

third, calculating the temperature control value $T_{set(n)}$ during the nth regulation and control according to the following formula:

$$T_{set(n)} = T_{(n)}' - TSV_{(n)}/a_n; \text{ and}$$

if $B \notin [0.2, 0.5]$, calculating the temperature control value $T_{set(n)}$ during the nth regulation and control according to the following formula:

$$T_{set(n)} = T_{(n)} - TSV_{(n)}/a'.$$

When the operation instruction is the automatic setting instruction, determining, by the automatic setting module, the temperature control value according to the automatic setting instruction includes:

obtaining, by the automatic setting module, an outdoor average slip temperature $T_{omn}$ of the present day, the outdoor average slip temperature $T_{om(n-1)}$ of the previous day and the average indoor slip temperature $T_{im(n-1)}$ of the previous day within the same time period from the storage module; and calculating, by the automatic setting unit, the temperature control value $T_{set(n)}$ according to the following formula:

$$T_{set(n)} = T_{im(n-1)} + 0.3[T_{om(n)} - T_{om(n-1)}],$$

Preferably, the determination of the indoor average slip temperature includes:

dividing 24 hours of every day into a plurality of time periods according to a preset number, wherein the preset number is greater than 1 and is 5 in the present embodiment;

respectively replacing the indoor average slip temperatures within the time periods on the first day after the installation of the intelligent dynamic control system with the actual indoor average slip temperatures within the corresponding time periods;

respectively calculating the indoor average slip temperatures within the time periods of each remaining day according to the following formula:

$$T_{im(n)} = 0.2 T_{set(n)} + 0.8 T_{im(n-1)};$$

in the formula: $T_{set(n)}$ represents the temperature control value set for the last time within the time period; $T_{im(n-1)}$ represents the indoor average slip temperature within the same time period of the (n−1)th day; and calculating, by the storage module, the indoor average slip temperature within the time period at the end point of each time period, and storing a calculation result.

Preferably, the determination of the outdoor slip average temperature includes:

replacing the outdoor slip temperature $T_{om(1)}$ on the first day of the installation of the intelligent dynamic control system with an outdoor average temperature calculated by the weather forecast data of the present day;

calculating the outdoor slip temperature $T_{om(n)}$ of each remaining day according to the following formula:

$$T_{om(n)} = 0.8 T_{out(n)} + 0.2 T_{om(n-1)};$$

in the formula: $T_{out(n)}$ represents the outdoor average temperature of the present day calculated according to the weather forecast data of the nth day; and calculating, by the storage module, the outdoor slip average temperature of the present day at 00:00 every day, and storing the calculation result.

Compared with the closest prior art, the present invention has the following beneficial effects:

1. According to the technical solution provided by the present invention, the system is simple, convenient to implement, good in control effect and remarkable in energy saving effect; outdoor temperature data are collected by the outdoor temperature collector and are compared with the indoor temperature collected by the indoor temperature collector, in combination with the parameters of resident population, and by means of analysis and intelligent adjustment of the indoor temperature, the most comfortable temperature is provided for indoor residents; furthermore, constant control and constant adjustment can be achieved, thereby not only ensuring the comfort, but also avoiding unnecessary energy consumption; and respective adjustment is provided for each house and each room, the space occupation is small, and the adjustment efficiency is high.

2. According to the technical solution provided by the present invention, a temperature regulation and control module of a control subsystem can achieve three modes of traditional regulation and control, intelligent regulation and control, and evaluation regulation and control depending on the user choices, and different regulation and control can be performed in combination with the indoor and outdoor temperatures, user parameters, user habits and the like; the various regulation and control can achieve the most comfortable and healthy temperatures for the users; and the three modes are independent from each other and can be flexibly switched.

BRIEF DESCRIPTION OF THE DRAWINGS

The present invention will be further described below in combination with the drawings:

FIG. 1 is a schematic diagram of a control system provided by the present invention.

DETAILED DESCRIPTION OF THE EMBODIMENTS

The technical solutions in the embodiments of the present application are clearly and completely described below in combination with the drawings in the embodiments of the present application.

Embodiment 1

The present invention provides an intelligent dynamic control system of an indoor temperature. The system includes a controller, and a human-computer interaction interface, a temperature adjustment device, an indoor temperature collector and an outdoor temperature collector, which are respectively connected with the controller.

The controller includes a human-computer interaction module, a regulation and control module, an automatic setting module, a temperature output module and a storage module;

the human-computer interaction module is respectively connected with the regulation and control module and the automatic setting module;

the temperature output module is respectively connected with the regulation and control module and the automatic setting module; and the storage module is respectively connected with the regulation and control module and the automatic setting module.

The regulation and control module includes a traditional regulation and control unit, an evaluation regulation and control unit and an intelligent regulation and control unit.

The storage module includes an evaluation regulation and control storage unit, an indoor slip average temperature storage unit, an outdoor slip average temperature storage unit, and a historical setting data storage unit.

The human-computer interaction module is connected with the human-computer interaction interface.

The temperature output module is connected with the temperature adjustment device.

The control system provided by the present invention performs control according to the following steps:

(1) sending an operation instruction to the controller through the human-computer interaction interface;

(2) determining, by the controller, a temperature control value according to the operation instruction; and (3) sending, by the controller, the temperature control value to the temperature adjustment device.

The operation instructions in the step (1) includes: an automatic setting instruction, a traditional regulation and control instruction, an intelligent regulation and control instruction and an evaluation regulation and control instruction.

The step (2) includes:

when the operation instruction is the traditional regulation and control instruction, using, by the traditional regulation and control unit, a temperature value input by the human-computer interaction interface as the temperature control value, and respectively sending the temperature control value to the temperature output module and the historical setting data storage unit of the storage module;

when the operation instruction is the intelligent regulation and control instruction, determining, by the intelligent regulation and control unit, the temperature control value according to parameters input by the human-computer interaction interface, and respectively sending the temperature control value to the temperature output module and the historical setting data storage unit of the storage module;

when the operation instruction is the evaluation regulation and control instruction, determining, by the evaluation regulation and control unit, the temperature control value according to an evaluation value input by the human-computer interaction interface, and respectively sending the temperature control value to the temperature output module and the historical setting data storage unit of the storage module; and when the operation instruction is the automatic setting instruction, determining, by the automatic setting module, the temperature control value according to the automatic setting instruction, and respectively sending the temperature control value to the temperature output module and the historical setting data storage unit of the storage module.

when the operation instruction is the intelligent regulation and control instruction, determining, by the intelligent regulation and control unit, the temperature control value according to parameters input by the human-computer interaction interface includes:

calculating, by the intelligent regulation and control unit, an air temperature $t_a$ around the human body according to an average thermal sensation index PMV formula described below:

$$PMV=(0.303e^{-0.036M}+0.0275)\times\{M-W-3.05[5.733-0.007(M-W)-P_a]-0.42(M-W-58.15)-1.73\times10^{-2}M(5.867-P_a)-f_{cl}h_c(t_{cl}-t_a)-0.0014M(34-t_a)-3.96\times10^{-8}f_{cl}[t_{cl}+273)^4-(t_r+273)^4]\}$$

In the formula, M represents a metabolic rate of the human body; W/m² represents external mechanical work W/m² of the human body; k represents a convective heat transfer coefficient, W/m²·° C.; $P_a$ represents a water vapor partial pressure of the air around the human body, $P_a$; $f_{cl}$ represents a clothing area coefficient; $t_r$ represents an indoor average radiant temperature, ° C. and $t_{cl}$ represents a clothing outer surface temperature, ° C.; and the temperature $t_a$ of the air around the human body is used as the temperature control value $T_{set(n)}$ of the present day.

the parameters input by the intelligent regulation and control unit according to the human-computer interaction interface include: the age of a user and the variety of clothing;

the variety of clothing includes: down jackets, cotton clothes, dust coats, sports and leisure jackets, suit jackets, sweaters, wool vests, autumn clothes, cotton knitwear, long-sleeved shirts, T-shirts, jeans, western style pants, woollen underpants, sweat pants, long johns, trousers, shorts, short skirts, dresses, socks, stockings, leather shoes, sneakers and sandals; and the thermal resistance of a set of clothing is obtained by adding the thermal resistance of each kind of clothing; the thermal resistance of various kinds of clothing includes:

down jackets 0.55, cotton clothes 0.5, dust coats 0.4, sports and leisure jackets 0.3, suit jackets 0.25, sweaters 0.28, wool vests 0.12, autumn clothes/cotton knitwear 0.2, long-sleeved shirts 0.2, short-sleeved shirts/T-shirts 0.09, jeans/western style pants 0.2, woollen underpants 0.28, sweat pants 0.25, long johns/trousers 0.2, shorts 0.06, short skirts 0.4, dresses 0.2, socks 0.02, stockings 0.05, leather shoes/sneakers 0.1 and sandals 0.02.

The metabolic rate M of the human body is calculated according to the following formula:

$$M=(M'-0.8)+[72.91-2.03A+0.0437A^2-0.00031A^3]/58.2;$$

In the formula: M' represents the metabolic rate of the human body under different activity types, and A represents the age in the parameters.

The value of the PMV includes:

statistics is performed on a maximum value and a minimum value of an outdoor average slip temperature of a located city, and a corresponding relationship between a temperature interval formed by the minimum value to the maximum value and a PMV value interval [−1, 1] is established:

when the outdoor temperature reaches the maximum value, the PMV is 1;

when the outdoor temperature reaches the minimum value, the PMV is −1; and when the outdoor temperature is a temperature between the maximum value and the minimum value, the value of PMV is within the PMV value interval [−1, 1] corresponding to the temperature.

Determining, by the evaluation regulation and control unit, the temperature control value according to an evaluation value input by the human-computer interaction interface includes:

(1) obtaining (a', T', TSV') stored in the storage module, and obtaining the indoor temperature from the indoor temperature collector; and (2) determining the temperature control value according to the evaluation value, the (a', T', TSV') and the indoor temperature.

During the first time regulation and control of the evaluation regulation and control, the step (2) includes:

first, sending a ($a_1$, $T_1$, $TSV_1$) signal to the storage module, and storing, by the storage module, the ($a_1$, $T_1$, $TSV_1$) in the form of (a', T', TSV');

in the formula: $T_1$ represents the indoor temperature during the first time regulation and control; $TSV_1$ represents the evaluation value during the first time regulation and control, the value range thereof is 2 to −2, and the corresponding evaluation value range when the human body feeling heat is 0 to 2; the corresponding evaluation value when the human body feels cold is −2 to 0; and $a_1$ represents the Griffith coefficient, $a_1=0.33$; and second, calculating the temperature control value $T_{set1}$ according to the following formula:

$$T_{set1}=T_1-TSV_1/a_1.$$

During the non first time regulation and control of the evaluation regulation and control, the step (2) includes:

calculating the parameter B according to the following formula:

$$B=\frac{TSV'-TSV_{(n)}}{T'-T_{(n)}};$$

in the formula: TSV' represents the evaluation value stored in the storage module, T' represents the indoor temperature stored in the storage module, $TSV_{(n)}$ represents the evaluation value during the nth regulation and control, and $T_{(n)}$ represents the indoor temperature during the nth regulation and control; n≥2;

if B∈[0.2,0.5], calculating the temperature control value $T_{set(n)}$ according to the following method:

first, correcting the Griffith coefficient, the indoor temperature and the evaluation value according to the following formula:

$$a_n=[0.2(TSV_{(n)}-TSV')/(T_{(n)}-T')+0.8a'];$$

$$T_{(n)}'=(T'+T_{(n)})/2;$$

$$TSV_{(n)}'=[TSV'+TSV_{(n)}]/2;$$

in the formula: $a_n$ represents a corrected Griffith coefficient, $T_{(n)}'$ represents a corrected room temperature during the nth regulation and control, and $TSV_{(n)}'$ represents a corrected evaluation value during the nth regulation and control;

second, sending $(a_n, T_{(n)}', TSV_{(n)}')$ to the storage module, and updating, by the storage module, the (a', T', TSV') by using the $(a_n, T_{(n)}', TSV_{(n)}')$, and storing the same;

third, calculating the temperature control value $T_{set(n)}$ during the nth regulation and control according to the following formula:

$$T_{set(n)}=T_{(n)}'-TSV_{(n)}'/a_n; \text{ and}$$

if B∉[0.2,0.5], calculating the temperature control value $T_{set(n)}$ during the nth regulation and control according to the following formula:

$$T_{set(n)}=T_{(n)}-TSV_{(n)}/a'.$$

When the operation instruction is the automatic setting instruction, determining, by the automatic setting module, the temperature control value according to the automatic setting instruction includes:

obtaining, by the automatic setting module, an outdoor average slip temperature $T_{omn}$ of the present day, the outdoor average slip temperature $T_{om(n-1)}$ of the previous day and the average indoor slip temperature $T_{im(n-1)}$ of the previous day within the same time period from the storage module; and calculating, by the automatic setting unit, the temperature control value $T_{set(n)}$ according to the following formula:

$$T_{set(n)}=T_{im(n-1)}+0.3[T_{om(n)}-T_{om(n-1)}].$$

The determination of the indoor average slip temperature includes:

dividing 24 hours of every day into a plurality of time periods according to a preset number, wherein the preset number is greater than 1 and is 5 in the present embodiment;

respectively replacing the indoor average slip temperatures within the time periods on the first day after the installation of the intelligent dynamic control system with the actual indoor average slip temperatures within the corresponding time periods;

respectively calculating the indoor average slip temperatures within the time periods of each remaining day according to the following formula:

$$T_{im(n)}=0.2T_{set(n)}+0.8T_{im(n-1)};$$

in the formula: $T_{set(n)}$ represents the temperature control value set for the last time within the time period; $T_{im(n-1)}$ represents the indoor average slip temperature within the same time period of the (n−1)th day; and calculating, by the storage module, the indoor average slip temperature within the time period at the end point of each time period, and storing a calculation result.

The determination of the outdoor slip average temperature includes:

replacing the outdoor slip temperature $T_{om(1)}$ on the first day of the installation of the intelligent dynamic control system with an outdoor average temperature calculated by the weather forecast data of the present day;

calculating the outdoor slip temperature $T_{om(n)}$ of each remaining day according to the following formula:

$$T_{om(n)}=0.8T_{out(n)}+0.2T_{om(n-1)};$$

in the formula: $T_{out(n)}$ represents the outdoor average temperature of the present day calculated according to the weather forecast data of the nth day; and calculating, by the storage module, the outdoor slip average temperature of the present day at 00:00 every day, and storing the calculation result.

Finally, it should be noted that the described embodiments are merely a part, but not all, of the embodiments of the present application. All of other embodiments, obtained by those of ordinary skill in the art based on the embodiments of the present application without any creative effort, fall into the protection scope of the present application.

What is claimed is:

1. A control method for an intelligent dynamic control system of an indoor temperature, wherein the system comprises a controller, and a human-computer interaction interface, a temperature adjustment device, an indoor temperature collector and an outdoor temperature collector, which are respectively connected with the controller, the method comprising the following steps:

(1) sending an operation instruction to the controller through the human-computer interaction interface;

(2) determining, by the controller, a temperature control value according to the operation instruction, wherein when the operation instruction is the traditional regulation and control instruction, using, by the traditional regulation and control unit, a temperature value input by the human-computer interaction interface as the temperature control value, and respectively sending the temperature control value to the temperature output module and the historical setting data storage unit of the storage module;

when the operation instruction is the intelligent regulation and control instruction, determining, by the intelligent regulation and control unit, the temperature control value according to parameters input by the human-computer interaction interface, and respectively sending the temperature control value to the temperature output module and the historical setting data storage unit of the storage module;

when the operation instruction is the evaluation regulation and control instruction, determining, by the evaluation regulation and control unit, the temperature control value according to an evaluation value input by the human-computer interaction interface, and respectively sending the temperature control value to the temperature output module and the historical setting data storage unit of the storage module; and when the operation instruction is the automatic setting instruction, determining, by the automatic setting module, the temperature control value according to the automatic setting instruction, and respectively sending the temperature control value to the temperature output module and the historical setting data storage unit of the storage module; and (3) sending, by the controller, the temperature control value to the temperature adjustment device, wherein when the operation instruction is the intelligent regulation and control instruction, determining, by the intelligent regulation and control unit, the temperature control value according to parameters input by the human-computer interaction interface includes:

calculating, by the intelligent regulation and control unit, an air temperature $t_a$ around the human body according to an average thermal sensation index PMV formula described below:

$$PMV=(0.303e^{-0.036M}+0.0275)\times\{M-W-3.05[5.733-0.007(M-W)-P_a]-0.42(M-W-58.15)-1.73\times 10^{-2}M(5.867-P_a)-f_{cl}h_c(t_{cl}-t_a)-0.0014M(34-t_a)-3.96\times10^{-8}f_{cl}[t_{cl}+273)^4-(t_r+273)^4]\}$$

in the formula, M represents a metabolic rate of the human body; W/m$^2$ represents external mechanical work W/m$^2$ of the human body; $h_c$ represents a convective heat transfer coefficient, W/m$^2$ ·° C.; $P_a$ represents a water vapor partial pressure of the air around the human body, $P_a$; $f_{cl}$ represents a clothing area coefficient; $t_r$ represents an indoor average radiant temperature, ° C. and $t_{cl}$ represents a clothing outer surface temperature, ° C.; and the temperature $t_a$ of the air around the human body is used as the temperature control value $T_{set(n)}$ of the present day.

2. The control method according to claim 1, wherein the operation instructions in the step (1) includes:

an automatic setting instruction, a traditional regulation and control instruction, an intelligent regulation and control instruction and an evaluation regulation and control instruction.

3. The control method according to claim 1, wherein the metabolic rate M of the human body is calculated according to the following formula:

$$M=(M'-0.8)+[72.91-2.03A+0.0437A^2-0.00031A^3]/58.2;$$

In the formula: M' represents the metabolic rate of the human body under different activity types, and A represents the age in the parameters.

4. The control method according to claim 1, wherein the value of the PMV includes:

statistics is performed on a maximum value and a minimum value of an outdoor average slip temperature of a located city, and a corresponding relationship between a temperature interval formed by the minimum value to the maximum value and a PMV value interval [−1, 1] is established:

when the outdoor temperature reaches the maximum value, the PMV is 1;

when the outdoor temperature reaches the minimum value, the PMV is −1; and when the outdoor temperature is a temperature between the maximum value and the minimum value, the value of PMV is within the PMV value interval [−1, 1] corresponding to the temperature.

5. The control method according to claim 1, wherein determining, by the evaluation regulation and control unit, the temperature control value according to an evaluation value input by the human-computer interaction interface includes:

(1) obtaining (a', T', TSV') stored in the storage module, and obtaining the indoor temperature from the indoor temperature collector; and (2) determining the temperature control value according to the evaluation value, the (a', T', TSV') and the indoor temperature.

6. The control method according to claim 5, wherein during the first time regulation and control of the evaluation regulation and control, the step (2) includes:

first, sending a $(a_1, T_1, TSV_1)$ signal to the storage module, and storing, by the storage module, the $(a_1, T_1, TSV_1)$ in the form of (a', T', TSV');

in the formula: $T_1$ represents the indoor temperature during the first time regulation and control; $TSV_1$ represents the evaluation value during the first time regulation and control, the value range thereof is 2 to −2, and the corresponding evaluation value range when the human body feeling heat is 0 to 2; the corresponding evaluation value when the human body feels cold is −2 to 0; and $a_1$ represents the Griffith coefficient, $a_1$=0.33; and second, calculating the temperature control value $T_{set1}$ according to the following formula:

$$T_{set1}=T_1-TSV_1/a_1.$$

7. The control method according to claim 6, wherein during the non first time regulation and control of the evaluation regulation and control, the step (2) includes:

calculating the parameter B according to the following formula:

$$B=\frac{TSV'-TSV_{(n)}}{T'-T_{(n)}};$$

in the formula: TSV' represents the evaluation value stored in the storage module, T' represents the indoor temperature stored in the storage module, $TSV_{(n)}$ represents the evaluation value during the nth regulation and control, and $T_{(n)}$ represents the indoor temperature during the nth regulation and control; n≥2;

if B∈[0.2,0.5], calculating the temperature control value $T_{set(n)}$ according to the following method:

first, correcting the Griffith coefficient, the indoor temperature and the evaluation value according to the following formula:

$a_n = [0.2(TSV_{(n)} - TSV')/(T_{(n)} - T') + 0.8a']$;

$T_{(n)}' = (T' + T_{(n)})/2$;

$TSV_{(n)}' = [TSV' + TSV_{(n)}]/2$;

in the formula: $a_n$ represents a corrected Griffith coefficient, $T_{(n)}'$ represents a corrected room temperature during the nth regulation and control, and $TSV_{(n)}'$ represents a corrected evaluation value during the nth regulation and control;

second, sending $(a_n, T_{(n)}', TSV_{(n)}')$ to the storage module, and updating, by the storage module, the $(a', T', TSV')$ by using the $(a_n, T_{(n)}', TSV_{(n)}')$, and storing the same;

third, calculating the temperature control value $T_{set(n)}$ during the nth regulation and control according to the following formula:

$T_{set(n)} = T_{(n)}' - TSV_{(n)}'/a_n$; and if B∉[0.2,0.5], calculating the temperature control value $T_{set\ (n)}$ during the nth regulation and control according to the following formula:

$T_{set(n)} = T_{(n)} - TSV_{(n)}/a'$.

8. The control method according to claim 1, wherein when the operation instruction is the automatic setting instruction, determining, by the automatic setting module, the temperature control value according to the automatic setting instruction includes:

obtaining, by the automatic setting module, an outdoor average slip temperature $T_{omn}$ of the present day, the outdoor average slip temperature $T_{om(n-1)}$ of the previous day and the average indoor slip temperature $T_{im(n-1)}$ of the previous day within the same time period from the storage module; and calculating, by the automatic setting unit, the temperature control value $T_{set(n)}$ according to the following formula:

$T_{set(n)} = T_{im(n-1)} + 0.3[T_{om(n)} - T_{om(n-1)}]$.

9. The control method according to claim 1, wherein the determination of the indoor average slip temperature includes:

dividing 24 hours of every day into a plurality of time periods according to a preset number, wherein the preset number is greater than 1 and is 5 in the present embodiment;

respectively replacing the indoor average slip temperatures within the time periods on the first day after the installation of the intelligent dynamic control system with the actual indoor average slip temperatures within the corresponding time periods;

respectively calculating the indoor average slip temperatures within the time periods of each remaining day according to the following formula:

$T_{im(n)} = 0.2T_{set(n)} + 0.8T_{im(n-1)}$;

in the formula: $T_{set(n)}$ represents the temperature control value set for the last time within the time period; $T_{im(n-1)}$ represents the indoor average slip temperature within the same time period of the (n−1)th day; and calculating, by the storage module, the indoor average slip temperature within the time period at the end point of each time period, and storing a calculation result.

10. The control method according to claim 4, wherein the determination of the outdoor slip average temperature includes:

replacing the outdoor slip temperature $T_{om(1)}$ on the first day of the installation of the intelligent dynamic control system with an outdoor average temperature calculated by the weather forecast data of the present day;

calculating the outdoor slip temperature $T_{om(n)}$ of each remaining day according to the following formula:

$T_{om(n)} = 0.8T_{out(n)} + 0.2T_{om(n-1)}$;

in the formula: $T_{out(n)}$ represents the outdoor average temperature of the present day calculated according to the weather forecast data of the nth day; and calculating, by the storage module, the outdoor slip average temperature of the present day at 00:00 every day, and storing the calculation result.

* * * * *